Feb. 28, 1956   T. R. KNOWLES   2,736,196
DYNAMOMETER
Filed Dec. 1, 1951

INVENTOR:
TALBOT R. KNOWLES

By Herbert E. Metcalf

United States Patent Office 2,736,196
Patented Feb. 28, 1956

2,736,196

DYNAMOMETER

Talbot R. Knowles, Los Angeles, Calif., assignor to Northrop Aircraft, Inc., Hawthorne, Calif., a corporation of California Application December 1, 1951, Serial No. 259,402

6 Claims. (Cl. 73—136)

This invention relates to dynamometers and more particularly to a means for measuring the torque expended in machines or instruments and torque available in motors.

An object of the present invention is to devise a means for precisely measuring the torque available in motors.

Another object of the present invention is to devise a means for precisely measuring the torque expended in driving mechanical devices.

Still another object of the present invention is to devise a dynamometer with a precise measurement characteristic while displaying an adaptability to measuring both available output and expendable input.

The foregoing objects are accomplished, in short, by attaching a motor to a shaft such that torques produced at the motor's output are transmitted to the shaft. Thereafter the motor's output is loaded with machinery under test or by a torque absorbing device, such as a Prony brake. When power is applied to the motor a torque, equal in value to the torque utilized in the machinery or brake, will be developed in the shaft; most of this torque is equalized by means of weights on a lever arm attached to the shaft. The remaining torque is brought to a null condition by a counteractive torque caused by the force of a spring balance device on a second lever arm. In performing this torque equalization operation, conditions are established that enable a precise measurement of this torque to be made.

This invention possesses numerous other objects and features, some of which, together with the foregoing, will be set forth in the following description of a preferred embodiment of the invention, and the invention will be more fully understood by reference to the attached drawings, in which.

Figure 1:
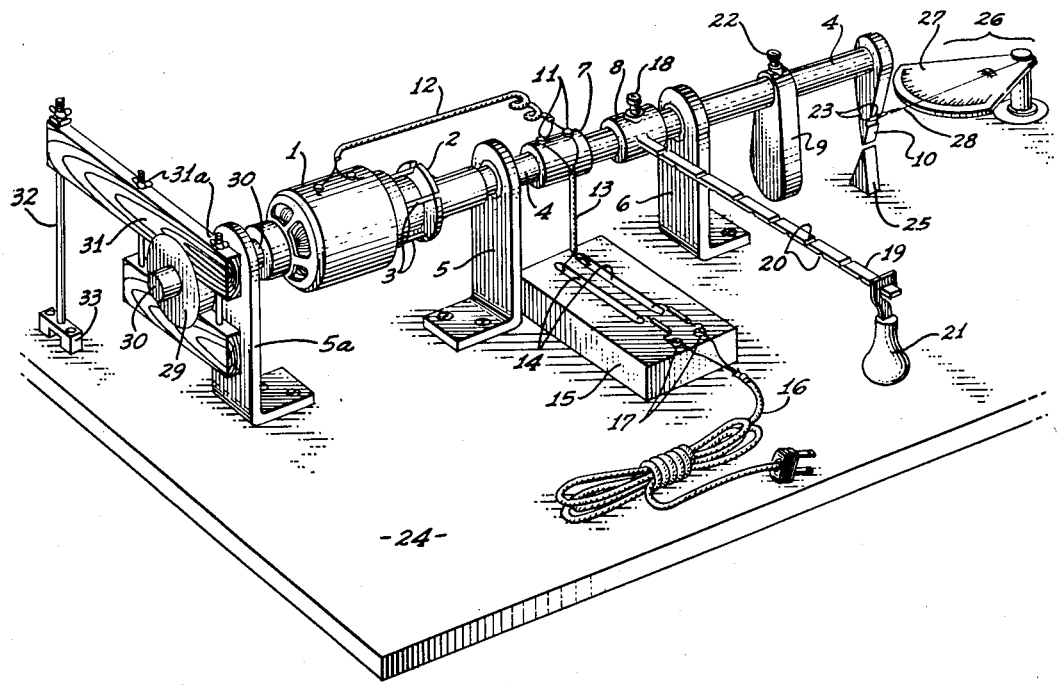
Fig. 1 is a perspective diagrammatic view of the preferred construction for the present dynamometer invention, showing a Prony brake attached thereto as a power absorbing device.

Referring first to Figure 1, an electric motor 1 is detachably mounted at its external housing to a slotted motor plate 2 by means of plate screws 3. Motor plate 2 is rigidly connected to a shaft 4 which is supported by supports 5 and 6. A rotatable connection between shaft 4 and supports 5 and 6 is fashioned such as to permit relatively frictionless rotational motion between them. A rotor output shaft 30 extends from the opposite end of motor 1, and the stator of the motor is fixed to the interior of the housing as usual.

Attached to and capable of rotation with shaft 4 are a collar 7, a hub 8, a pendulum 9, and a pointer 10. Collar 7 is rigidly connected to shaft 4 and provides a support for electrical terminals 11. An electrical connection to motor 1 from terminals 11 is provided by motor leads 12. Terminals 11 also support contact wires 13 and connect them to motor leads 12. To further complete the electrical circuit to motor 1, contact wires 13 are immersed in a conductive liquid 14, such as mercury, held in depressions in a block 15, and power leads 16 bring electrical power to the conductive liquid 14 by means of terminals 17. The source of electrical power to power leads 16 may be a battery, generator, or like source, whose output is acceptable as an input to motor 1. Thus, a frictionless, zero-torque connection is made from the motor to the power supply.

Hub 8 may be rotated with respect to shaft 4, but a hub set screw 18 permits the hub to be clamped to the shaft. A lever arm 19, with notches 20 disposed on opposite sides, is rigidly attached to hub 8. One or more weights 21 are hung on lever arm 19 in notches 20 such that they may be removed or repositioned in different notches.

Pendulum 9 is rotatably attached to shaft 4, but may be locked to it by an adjustment of a pendulum set screw 22.

Pointer 10 is rigidly attached to shaft 4 and has V-grooves 23 disposed near its lower pointed end.

A table 24 provides a rigid base for supports 5 and 6, for block 15 and for an index pointer 25. Index pointer 25 is disposed immediately below pointer 10. A rotor bearing-support 5a may be provided to support the output shaft 30 from the table 24, but is not necessary with a fractional horse-power motor at 1.

Pointer 10 serves as a null condition indicator in conjunction with index pointer 25 and as a second lever arm in conjunction with a spring balance 26. A simple form of spring balance is shown comprising a body 27 and a spring wire 28. One end of wire 28 is attached to the V-grooves 23 while the other end is attached to the body 27. The body 27 has scale markings along one edge such that a force causing a deflection of the wire 28 from a rest position is measurable by noting the scale mark opposite the wire 28 when in its new position. Such spring balances are well known in the art.

When the present invention is utilized to measure the torque output of a motor, some means must be employed to mechanically load the motor at its output. Such a loading device is shown as a Prony brake in Figure 1. A wheel 29 is attached to motor output shaft 30 such that energization of the motor causes the wheel to rotate. A Prony brake 31 is connected to both the wheel 29 and the table 24 such that the brake tends to prevent relative rotation of wheel 29 with respect to the table 24. A bolt 32 and a holding block 33 attached to the table afford a means for connecting the Prony brake to the table.

Figure 2:
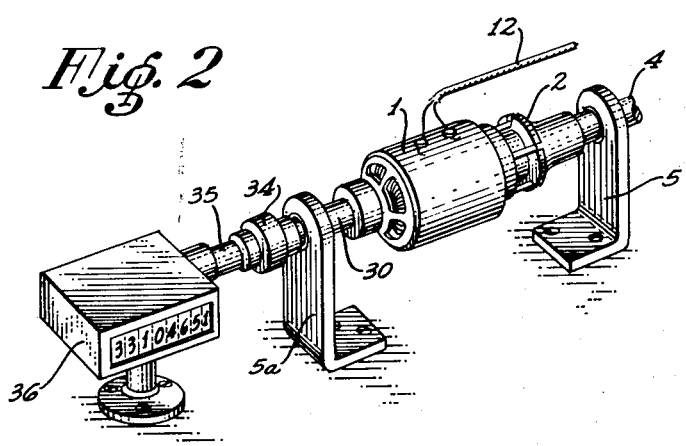
Figure 2 is a perspective diagrammatic view showing, in general, how test machines are coupled to the present invention.

Referring to Figure 2, the rotor output shaft 30 from motor 1 is coupled to an input shaft 35, by means of coupling 34, in order that motor 1 can drive a mechanical counter 36, for example. Coupling 34 is herein shown as a flexible coupling, but geared couplings or direct couplings of other types may be employed.

The mode of operation of the present invention is as follows:

The direction of rotation of the motor is determined by momentarily energizing motor 1 and observing output shaft 30. Hub set screw 18 is loosened to permit motion of the lever arm 19 and hub 8 with respect to the shaft 4. All weights are removed from lever arm 19 and it is positioned in a horizontal attitude such that any weights attached to it will cause a torque to be developed that will counteract torque transmitted from motor 1 to shaft 4 during motor operation. Set screw 18 is then tightened, thereby causing lever arm 19 and hub 8 to move integrally with shaft 4. Flat areas may be cut into shaft 4 under set screw 18 such that tightening the set screw aids in positioning the lever arm 19 in a horizontal plane.

The motor is now operated with nothing attached to the rotor shaft 30, at approximately the speed at which the desired load is to be rotated. If pointer 10 doesn't indicate towards index pointer 25, it should be brought to this null condition by rotating pendulum 9 with respect to shaft 4 thereby bringing the center of gravity of the rotating system to a position immediately below the center of shaft 4.

When pendulum 9 lies in a position to cause pointer 10 to indicate a null condition, with the arm 19 horizontal, pendulum set screw 22 is tightened, thereby locking pendulum 9 to shaft 4. The device is now ready for operation to measure the torque required to drive a desired load.

Assume, for example, that the output torque of motor 1 is to be investigated over a known range of load values. Figure 1 illustrates a configuration of equipment for such an investigation. Prior to connecting the Prony brake 31 and the wheel 29 to the motor output shaft 30, the lever arm 19 must be properly located and shaft 4 must be brought to a null condition as outlined above.

The connection of wheel 29 to the motor output shaft 30 and the connection of the Prony brake 31 to the wheel 29 and to the base 24 completes the initial assemblage. Electrical meters may be placed in the circuit to the power leads 16.

The motor 1 is energized by applying power to power leads 16. When the motor is energized, the wheel 29 will tend to rotate; its speed of rotation being determined to a large extent by the load imposed on it by the Prony brake 31. As brake nuts 31a are tightened or loosened, the friction between wheel 29 and the Prony brake 31 will increase or decrease, thereby causing a change in the loading of motor 1 and a resulting change of speed of rotation of motor 1. This frictional loading of wheel 29 is reflected through the motor and appears as a torque on shaft 4, thereby rotating shaft 4 from its initial null position. Thereafter, weights are hung on lever arm 19 at one or more of the notches to develop a torque on shaft 4, until pointer 10 rests at or very near a null condition. A further torque is applied to shaft 4 by attaching spring balance 26 to V-grooves 23 of pointer 10, holding the body 27 in a horizontal plane and rotating it until the spring wire 28 has deflected pointer 10 to its null indicating position opposite index pointer 25.

At this condition, the sum of the torques developed by weights 21 on lever arm 19 and by spring balance 26 acting on pointer 10 equals the load torque on wheel 29 within the measurability of the present invention. Obviously, friction between shaft 4 and supports 5, 5a and 6 affects the torque measurement; however, a proper choice of bearings at these places minimizes the error to less than .05 gram-inches, for light loads.

The torque contributed by weights on the lever arm 19 is equal to the distance from the center of shaft 4 to the notch in which the weight resides multiplied by the value of the weight. The torque contributed by a force on pointer 10 is equal to the distance from the center of shaft 4 to V-grooves 23 multiplied by the force as indicated by spring balance 26. A measure of the total torque is obtained by adding or subtracting one torque contribution to or from the other, depending upon an additive or subtractive application of force by spring balance 26. In order to quickly obtain the two torque components the notches on lever arm 19 are accurately spaced at known distances from the center of shaft 4, and spring balance 26 is calibrated in terms of the torque produced by it at V-grooves 23 in pointer 10.

Full knowledge of the motor under test may be obtained by performing several runs, each time varying the loading on wheel 29 by adjusting nuts 31a. During each run, readings may be taken of the speed of wheel 29, by means of a tachometer (not shown), of the value of the power applied to the motor, by means of meters placed in the circuit of power leads 16, and of the torque, by the procedure outlined above.

When the present invention is employed to determine the torque necessary to drive, for example, a mechanical counter, the steps involved are similar to those utilized in testing for the operational characteristics of a motor. Referring to Figure 2, initially lever arm 19 is properly positioned and shaft 4 is brought to a null condition. A connection is then made between rotor output shaft 30 and input shaft 35 to the mechanical counter 36 by means of coupling 34. Thereafter motor 1 is energized by application of power to power leads 16 and it drives the counter. Since the motor is mounted such that it is free to rotate with shaft 4, and since the electrical leads are provided with means which contribute no torque resistance to slight changes in position of the shaft 4, the loading of the rotor output shaft 30 causes a torque, equal in value to the torque necessary to operate the counter, to be developed along shaft 4. Torques developed by properly placing weights on lever arm 19 and by suitably manipulating spring balance 26 cause shaft 4 and pointer 10 to return to a null position, thereby enabling the operator to determine the value of this load torque by following the procedure here-to-fore discussed.

A convenient modification of the apparatus as described above is to include another lever arm on the opposite side of hub 8 from the first lever arm 19, the second arm being exactly like the first so as to provide a balanced assembly about the shaft 4. Then the hub 8 need never be reversed for motors with opposite direction of rotation, and the pendulum 9 does not have to compensate for the torque of the lever arm on which weights are to be hung.

While a mechanical counter is shown in Figure 2, other machines may readily replace it as the subject of the test. The present invention may be employed to measure torque necessary to operate electrical generators, to operate gear trains, to operate cams, or the like.

In operating the present invention it is to be noted that the major portion of the torque measurement is accomplished by utilizing weights on a lever arm; consequently the device does not rely upon an inaccurate set of spring balances as do most torsion coupling type of dynamometers. Only the residual torque is measured by the less accurate spring balance scale 26.

There is thus provided a reliable and efficient dynamometer, since the components employed are simple but capable of precise measurements. It is also a versatile device being readily applied to torque measurements of both input and output types and can be instantly changed to measure torque in a reverse direction. As a laboratory instrument the present invention is particularly adapted to torque measurements of small motors and the power requirements of prototype mechanisms.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A dynamometer for testing a motor having a stator member and a rotor member, comprising: a shaft, means for fixedly and coaxially mounting said stator member on said shaft, the rotor of said motor being freely rotatable with respect to said shaft, said shaft being supported in nearly frictionless bearings, a first lever arm attached to said shaft to normally lie in a horizontal plane perpendicular to said shaft, a second lever arm attached to said shaft to normally lie in a vertical direction perpendicular to said shaft, a pendulous means rotatively adjustably attached to said shaft for initially bringing said shaft to a null condition wherein said first lever arm is directed horizontally and said second lever arm is directed vertically, means for applying power to said motor, means for applying relatively high known values of torque to said shaft through one of said lever arms, and means for applying relatively low known values of torque through the other one of said lever arms.

2. Apparatus in accordance with claim 1 including indicating means cooperatively related with said second lever arm to indicate said null condition.

3. A dynamometer for testing a motor having a stator member and a rotor member, comprising: a shaft, means for fixedly and coaxially mounting said stator member on said shaft, the rotor of said motor being freely rotatable with respect to said shaft, said shaft being supported in nearly frictionless bearings, a first lever arm attached to said shaft to normally lie in a horizontal plane perpendicular to said shaft, a second lever arm attached to said shaft to normally lie in a vertical direction perpendicular to said shaft, a pendulous means attached to said shaft for initially bringing said shaft to a null condition wherein said first lever arm is directed horizontally and said second lever arm is directed vertically, means for applying power to said motor, and means for applying known values of torque to said shaft through said lever arms comprising a known weight adapted to act on said first lever arm at known radii thereon, and elastic scale means adapted to act horizontally on said second lever arm, said scale means being adjustable to supply the required torque to maintain said null condition.

4. A dynamometer for testing a motor having a stator member and a rotor member, comprising: a shaft, means for fixedly and coaxially mounting said stator member on said shaft, said rotor being freely rotatable with respect to said shaft, said shaft being supported in nearly frictionless bearings, a first lever arm rotatably attached to said shaft, a set screw means for locking said first lever arm to said shaft, a second lever arm rigidly attached to said shaft, means cooperatively associated with said second lever arm to indicate a vertical attitude of said second lever arm, means for applying power to said motor whereby a frictionless, torqueless connection between a power source and said motor exists, a pendulous device rotatably attached to said shaft having a set screw means for locking said pendulous device to said shaft for producing a rotation of said shaft to rest position wherein said second lever arm is oriented in a vertical attitude and said first lever arm is oriented in a horizontal attitude when said motor is running free, and means whereby known forces are applied to said first and second lever arms for developing torques on said shaft opposing motor output torque when a load is connected to said motor.

5. Apparatus in accordance with claim 4 wherein weights are hung in notches on said first lever arm to produce the major portion of said opposing torques on said shaft and wherein an adjustable indicating elastic balance means is operatively connected to said second lever arm to produce the remainder of said opposing torques sufficient to bring said shaft to said rest position.

6. A dynamometer for testing a motor having a stator member and a rotor member, comprising: a shaft, means for fixedly and coaxially mounting said stator member on said shaft, said shaft being supported in nearly frictionless bearings, a first lever arm connected perpendicularly to said shaft, a second lever arm connected to said shaft, null indicating means between said shaft and a fixed support to provide accurate determination of a null position where said first lever arm is horizontal, pendulous means adjustably attached to said shaft whereby said shaft initially can be brought to rest at said null position, a known weight adapted to act on said first lever arm at known distances from said shaft, and elastic scale means connected to act on said second lever arm, said scale means being adjustable to supply the required residual torque to maintain said null condition during operation.

References Cited in the file of this patent

UNITED STATES PATENTS

| 1,985,313 | Bryson | Dec. 25, 1934 |

FOREIGN PATENTS

| 763,166 | France | Feb. 5, 1934 |
| 145,371 | Australia | Apr. 25, 1936 |